April 26, 1966 J. J. DIGBY ETAL 3,247,727
ENGINE STARTER WITH ONE WAY CLUTCH
Filed May 11, 1964
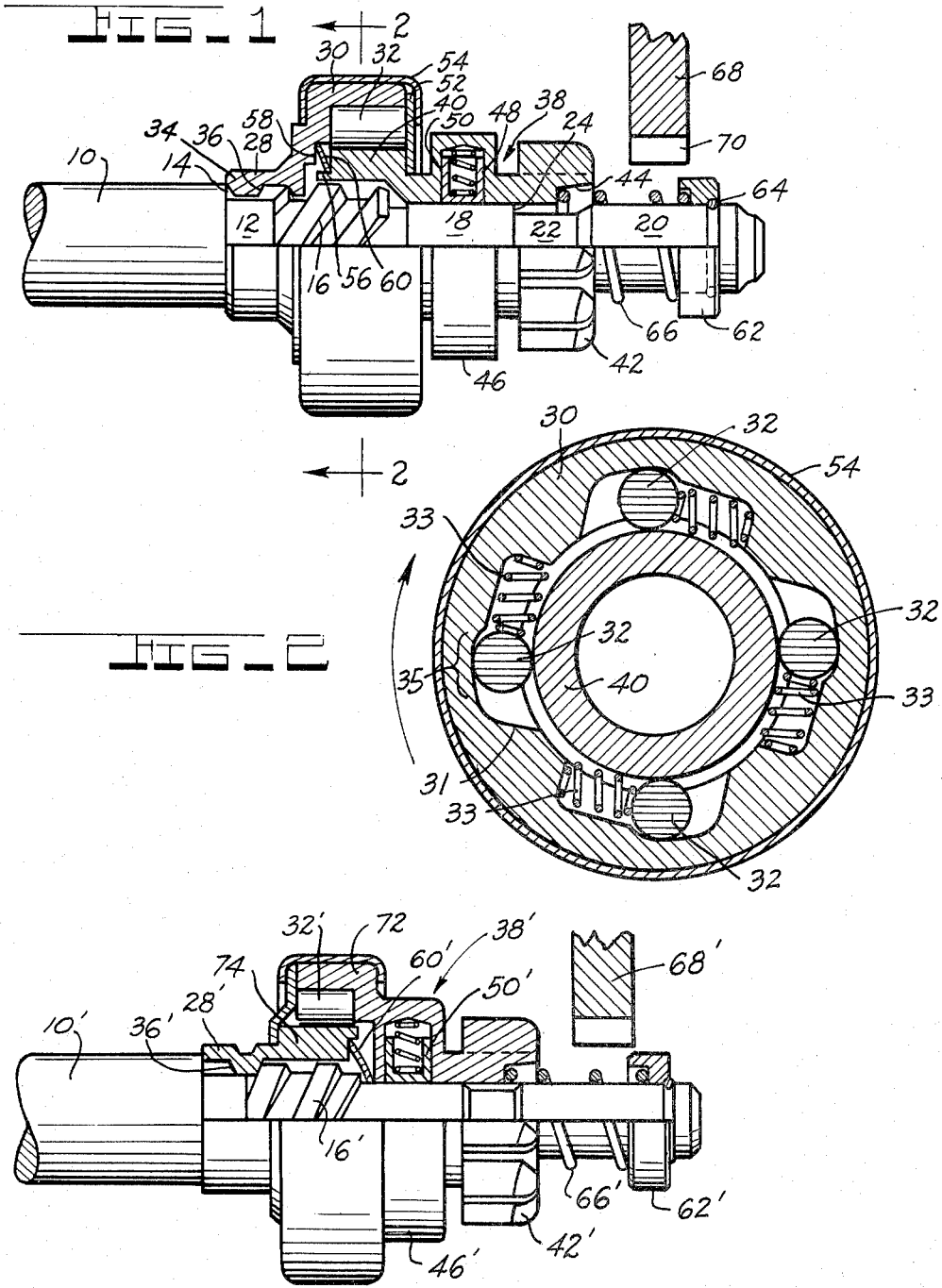
INVENTORS.
JAMES J. DIGBY.
PAUL F. GIOMETTI.
JOHN J. SABATINI.
BY
ATTORNEY.

United States Patent Office 3,247,727
Patented Apr. 26, 1966

3,247,727
ENGINE STARTER WITH ONE WAY CLUTCH
James J. Digby, John J. Sabatini, and Paul F. Giometti, Elmira, N.Y., assignors to The Bendix Corporation, Eclipse Machine Division, Elmira, N.Y., a corporation of Delaware
Filed May 11, 1964, Ser. No. 366,541
1 Claim. (Cl. 74—7)

The present invention relates to engine starter drives of the inertia type including roller clutch means for overrunning and energy dissipation.

It is an object of the present invention to provide an inertia starter drive device having roller clutch mechanism.

It is another object of the present invention to provide an inertia starter drive including centrifugally actuated means maintaining locked drive engagement and roller clutch means enabling overrunning operation during locked drive engagement.

It is a still further object of the present invention to provide an inertia starter drive wherein the driving and driven members are both engageable and disengageable by inertia including a roller clutch mechanism aiding in the dissipation of kinetic energy on disengagement.

Other objects and advantages of the present invention will become apparent on consideration of the accompanying description and attached drawings wherein:

FIGURE 1 is a view, partly in section, of a first embodiment of our invention;

FIGURE 2 is a section view of the roller clutch mechanism of FIGURE 1 and/or FIGURE 2 taken along section line 2—2; and, FIGURE 3 is a view, partly in section, of a second embodiment of our invention.

In FIGURE 1 of the drawing, there is illustrated a driving or power shaft 10 of a starter motor, not shown. Shaft 10 has a portion 12 forming a shoulder 14 and multiple lead helical screw threads 16 formed thereon. Power shaft 10 extends to the right of threads 16 having two spaced apart portions 18 and 20, respectively of approximately equal diameter separated by a reduced diameter portion 22 which forms a shoulder 24 with portion 18 and merges with portion 20 through the beveled portion 26.

Concentrically mounted on shaft 10 is a screw member 28 having an axially extending generally annular projection 30 defining an outer clutch race which confines on the outer extremity the clutch rollers 32. An axially extending hub portion 34 of screw member 28 has multiple lead helical screw threads 36 complementary and threadedly engaged with screw threads 16 of shaft 10.

Concentrically and slidably mounted on shaft 10 is a driven shaft member 38 having three functionally distinct subparts. At the leftmost end of driven shaft 38 there is formed an axially extending annular portion 40 which confines clutch rollers 32 on their inner extremity to form an inner clutch race. At the rightmost end of member 38, a pinion gear 42 is formed which contains a spring retaining recess at 44. Intermediate pinion gear 42 and inner clutch race 40, shaft 38 contains an enlarged cylindrical portion 46 which contains at least one radially extending blind cylindrical recess 48 in which is mounted a spring biased detent plunger 50 which bears against power shaft 10 (portion 18 in the illustrated position).

The roller members 32 are enclosed axially by an annular ring member 52 held in position by sheet metal cover 54 to provide a unitary clutch assembly. The leftmost edge of inner race 40 has a projection 56 forming an annular shoulder spaced from a complementary shoulder 58 formed in the inner surface of screw member 28. An annular wave washer 60 extends between shoulders 56 and 58 providing a resilient spring force urging inner race member against a stop provided by annular ring member 52. Inner and outer race members 30 and 40 and their connected parts are axially movable relative to one another a small distance established by the spacing between shoulders 56 and 58 and against the force of wave washer spring 60.

At the rightmost end of power shaft 10, there is concentrically mounted a spring retainer 62 held in place by snap ring 64. A helical coil spring 66 is concentrically mounted on power shaft 10 confined on one end by retainer 62 and on the other by spring recess 44 formed in pinion 42.

A ring gear fragment is illustrated at 68 having a plurality of gear teeth, one of which is illustrated at 70 which represents a driven device and its approximate spacing and location with respect to the starter device.

Operation

The position of the parts illustrated in FIGURE 1 represents the non-energized position of the parts prior to a starting cycle. In this condition, power shaft 10 is stationary and spring 66 urges the combined clutch and pinion assembly mounted on shaft 10 to the left in its retracted position.

When the starting motor is energized and begins to accelerate power shaft 10, the inertia of the screw member causes threads 36 to slip on threads 16 inducing relative rotation which causes screw member 28 and driven shaft member 38 to traverse to the right moving pinion 42 towards engagement with driven member 68. In this condition, the clutch roller members provide firm wedge engagement between outer and inner races 30 and 40, respectively, so that screw member 28 and driven shaft 38 move as a unitary piece against the force of spring 66.

As pinion 42 begins to engage the driven member 68, it is possible a pinion tooth will abut a ring gear tooth 70 which would disrupt the inertia build-up and provide impact forces that may damage the parts. In the arrangement shown, this potential detrimental effect is avoided by the cushioning effect of wave washer spring 60 which permits driven shaft 38 to move a limited degree relative to the screw member 28 until the pinion gear tooth has rotated sufficiently to pass between teeth 70 and it then provides a force producing a snap and positive engagement.

As pinion 42 traverses into full engagement with ring gear 68, detent plunger 50 snaps into the reduced diameter portion 22 of power shaft 10 whereupon pinion gear 42 is temporarily locked into position and cannot retract towards the disengaged position. Thus momentary overspeeding of ring gear 68 will not reverse the inertia forces causing disengagement due to erratic but temporary motion of the ring gear.

On engine start-up, ring gear 68 will accelerate and begin to drive and further accelerate driven shaft 38 through pinion 42. Since inner race 40 will not be driven faster than outer race 30, rollers 32 will move out of wedge contact to permit overrunning without driving power shaft 10 and thus starting motor armature at a high unsafe speed.

As the driven shaft 38 continues to accelerate with ring gear 68, it will attain a design disengagement speed whereby the centrifugal force of detent plunger 50 overcomes the spring bias permitting the plunger to move radially outwardly until it clears shoulder 24 of power shaft 10, releasing the locked engagement condition.

After release of plunger 50, the pinion will disengage from the ring gear as soon as the engine starts running, even though the starting motor is still energized. The high gear ratio between engine flywheel and starter pinion causes the pinion to overspeed the armature shaft and be driven out of mesh.

The operation of the roller clutch may be better understood with reference to FIGURE 2. The outer clutch race 30 contains a series of radially-extending slots 31 to accommodate rollers 32 and a spring member 33. The slots 31 have formed therein a ramp portion 35 (bracketed) which at its edge most remote from spring 33 is a spaced distance from the outer diameter of inner clutch race 40 less than the diameter of roller 32. At its edge closest to spring 33, it has a spaced distance from the inner race greater than the roller diameter. Thus on clockwise rotation of the outer race 30, springs 33 urge rollers 32 into wedge engagement causing outer race 30 and inner race 40 to rotate as if an integral assembly. The radial width of outer race member 30 is designed to permit some deflection on sharp engagements to cushion impact forces and prevent transmission of these forces back to the starting motor armature. During overrunning, inner race 40 will be driven at a rotational speed faster than the outer race. This imparts a friction force to the rollers opposing spring 33, urging the rollers out of wedge contact, thus permitting slip between the races.

However, when overrunning, a moderate friction force exists between inner clutch race 40 and outer race 30 through rollers 32 due to the spring 33 bias. Thus although most of the kinetic energy imported to the pinion gear 42 will not be transmitted through the clutch assembly, a small portion will be so transmitted to cause screw member 28 to over-speed the shaft 10 and thus traverse to the left in the disengaging direction due to inertia forces. While sufficient kinetic is passed to accomplish disengagement, it is sufficiently low to prevent the screw body 28 from slamming back against the shoulder of shaft 10 and rebounding towards the engaged direction.

Referring to FIGURE 3, a second embodiment of our invention is illustrated wherein similar parts bear the same numeral as the FIGURE 1 embodiment with prime mark notation added. In this embodiment the driven shaft 38′ contains an axially extending projection 72 which defines the clutch outer race. The inner race 74 is part of screw member 28′ and is threadedly engaged by helical screw threads 36′ to threads 16′ of power shaft 10′ thus reversing the inner and outer race connection from that of the FIGURE 1 embodiment. Wave washer 60′ biases driven shaft 38′ apart from inner race 74.

Operation of the FIGURE 3 embodiment conforms to that described for the FIGURE 1 embodiment.

While the invention has been described with reference to two specific embodiments, these are illustrative of the invention and not restrictive thereof. Numerous adaptations and modifications to the present invention may be made without departing from the scope or spirit of the present invention as defined in the following claim.

We claim:
An inertia engine starter drive comprising:
a power shaft member;
a driven shaft member concentric with said power shaft member having a pinion gear connected integrally therewith;
said power shaft member having a first helical screw thread extending over a portion of its length;
a screw member concentric with said power shaft having a second complementary helical screw thread slidably engaging said first helical screw thread;
said screw member having a first axially-extending segment formed therewith defining a first clutch race;
said driven shaft member having an axially-extending segment formed therewith defining a second clutch race concentric with and radially spaced from said first clutch race;
said first race and said second race axially movable with respect to each other;
a spring means interconnecting said first and second races to bias said races apart, said spring operative to absorb impact shocks on said pinion; and
a plurality of spring-biased roller members intermediate said first and second races to drivingly engage said race members when the rotational speed of said driven shaft does not exceed that of said screw member.

References Cited by the Examiner
UNITED STATES PATENTS

| | | | |
|---|---|---|---|
| 2,787,910 | 4/1957 | Sabatini | 74—7 |
| 2,902,125 | 9/1959 | House et al. | 192—45 |
| 3,057,212 | 10/1962 | Horen | 74—7 |
| 3,174,598 | 3/1965 | Mattson | 192—45 |
| 3,176,525 | 4/1965 | Rose | 74—7 |

DAVID J. WILLIAMOWSKY, *Primary Examiner.*